Figure 1:
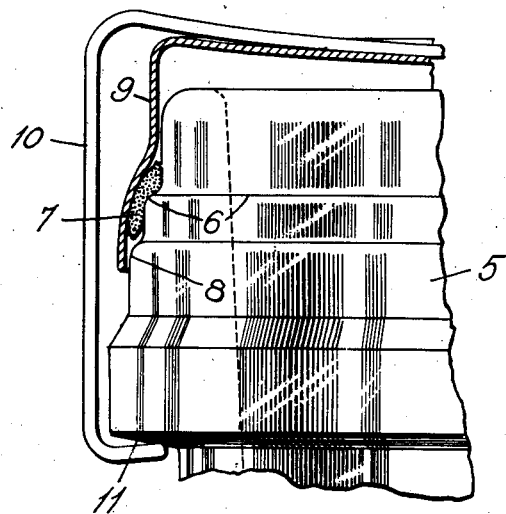

W. A. LORENZ.
CAN OR JAR AND ITS CLOSURE.
APPLICATION FILED AUG. 7, 1916.

1,333,761.  Patented Mar. 16, 1920.

Witness:
S. S. Grotta.

Inventor:
William A. Lorenz
by W. H. Homiss
Atty.

UNITED STATES PATENT OFFICE.

WILLIAM A. LORENZ, OF HARTFORD, CONNECTICUT.

CAN OR JAR AND ITS CLOSURE.

1,333,761. Specification of Letters Patent. Patented Mar. 16, 1920.

Application filed August 7, 1916. Serial No. 113,418.

*To all whom it may concern:*

Be it known that I, WILLIAM A. LORENZ, a citizen of the United States, residing at Hartford, in the county of Hartford and State of Connecticut, have invented new and useful Improvements in Cans or Jars and Their Closures, of which the following is a specification.

This invention is an improved form of can or jar and closure, which although intended and adapted for general use is especially useful in connection with such containers when hermetically sealed in connection with the hot processing of their contents. In such processing the container is filled with its contents, and the sealing gasket and cover are placed in position, the latter being clamped, or held in position, to prevent the displacement of the cover or the contents of the container in the processing, or in the handling incidental thereto, and also preventing the return of the air during the cooling, after the processing operation, so as to obtain fuller effect of the atmospheric pressure upon the top of the cover, to make a tight seal.

With the cover thus held in a closed position upon the gasket during the processing operation, the steam or air generated under pressure by the heat of the operation must escape past the gasket. In those types of containers and closures in which the gasket rests upon a horizontal shoulder of the container, the permanent or detrimental displacement of the gasket by the escaping pressure, is obviated to some extent by the direct support of the shoulder, and also by the resistance of the gasket to being stretched in a horizontal plane to a sufficient extent to carry it off from its seat on a relatively wide horizontal shoulder, or to a point from which its own elasticity will not restore it to sealing position after the pressure ceases. But in other types of containers now in common use where the gasket projects beyond its supporting shoulder of the container, and especially where the gasket is inclined at an angle across a conical or rounded shoulder of the container, and is sealed by a wedging pressure of a conical cover exerted obliquely toward the shoulder of the container, there is a decided tendency for the steam and air, escaping under considerable pressure, to move the gasket downwardly, and displace it from its seat. Such a conical or wedging form of closure is shown in U. S. Patent No. 826,105 of July 17, 1906 (Figs. 7 and 8). In this general type of wedging closures, which are adapted to create and maintain a firm and certain seal, there is, when employed in the processing operation referred to, a pronounced tendency for the escaping steam and air to displace the gasket downwardly from its proper sealing position, sometimes to the extent of forcing portions of the gasket entirely out from between the container and its cover rim, thus preventing the subsequent making of a proper seal.

Figure 2:
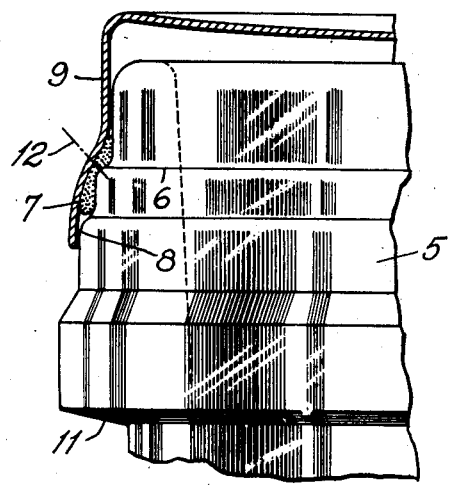

This invention is therefore herein shown and described as being particularly adapted to the inclined or wedging type of closure referred to. The drawings show in large scale one side of a container and its closure in elevation, the cap or cover and the gasket being shown in cross-section. In Fig. 1 the gasket is shown to be only slightly compressed by the cover, in the position occupied during the processing operation, while Fig. 2 shows the same parts after the gasket has been fully compressed by the atmospheric pressure, following a successful processing and sealing operation.

The container 5 is provided with a beveled or rounded shoulder 6 for seating the gasket and receiving the sealing pressure of the gasket 7. Below that shoulder the neck of the container is enlarged at 8 so as to nearly fill the rim or flange of the cover 9, the lower edge of which projects below the said shoulder or enlargement, sufficient space being left between the sealing shoulder 6 and the enlargement 8 by a reëntrant contour to allow for receiving the projecting or overhanging portion of the gasket. The enlargement below the sealing shoulder 6 may be in the form of a semi-rounded shoulder, as shown in the drawings, or it may be otherwise shaped to suit the exigencies of manufacture, the essential provisions being to allow suitable space by the reëntrant contour above the joint at 8 for accommodating that portion of the gasket which is outside of and below the sealing shoulder 6, while substantially filling the rim of the cover, below that space. The joint thus made at 8 prevents any portion of the gasket from being forced out through that joint to a detrimental extent during the processing operation, which takes place prior to the sealing operation, and while the gasket is held to its seat only by its own elasticity and by the comparatively slight pressure of the cover upon it.

In operation, the container is filled with its intended contents, the gasket and cover are placed in position, and the cover is clamped or held approximately as shown in Fig. 1, in which the holding means is a temporary spring clamp or clip 10, bearing upon the top of the cover, with its ends extending beneath any suitable collar or shoulder 11 of the container forming a seat for the clamp. While in the condition shown in Fig. 1 the jar and its contents are subjected to the processing operation, in which the contents of the jar are heated, thus expanding the confined air and gases, the pressure of which acts against the under side of the cover, raising it against the opposing pressure of the clamp 10 sufficiently to allow the air and steam to escape past the sealing seat. For the best results, the downward pressure of the clamp is only made sufficient to insure making an air-tight sealing joint at the close of the processing operation, and while the jar contents are cooling and beginning to contract, so as to prevent the reëntry of the air at that time, thereby preserving whatever vacuum may be obtainable by the cooling and contracting of the contents. Increased pressure from the clamp would correspondingly increase the resistance to the forcing out of the expanding air and gases, and thus result in a lower vacuum. On the other hand, insufficient pressure from the clamp would be liable to leave openings between the cover and gasket sufficient to permit the reëntrance of the air after processing, it being difficult to manufacture the jar and the gasket and the cover so accurately as to produce a perfectly smooth and airtight joint entirely around the gasket by the mere weight of the cover. On account of these unavoidable variations in the parts forming the joint, it will frequently happen that the gasket joint is closed less firmly at some portions than at others, and the looser portions of the gasket are liable to be forced out by the pressure of the escaping air and gases away from the sealing seat, and even entirely out from between the cover rim and the jar, thus precluding the subsequent sealing of the jar. The shoulder or enlargement 8 below the gasket fills and fits the lower rim of the cover sufficiently to prevent the gasket from being displaced far enough to impair its sealing functions, thus forming a slip joint, or telescoping joint, which is sufficiently close to prevent the entrance and extrusion of the gasket, and is sufficiently long to allow of the telescoping movement of the cover rim during the processing and sealing operations. Under these conditions the escaping pressure finds its way out at the point of least resistance between the flexible gasket and the cover rim, which is usually also flexible. As the jar and its contents cool, following the processing operation, the resulting rarification inside the container causes atmospheric pressure, bearing upon the top of the cover to press the latter down to the sealing position shown in Fig. 2, in which the gasket is firmly wedged and compressed downwardly and inwardly against the rounded edge of the sealing shoulder 6. That shoulder and its opposing portion of the cover flange compress the gasket between them at an angle substantially along the line indicated at 12, thus pinching the gasket at that angle approximately around its middle portion, extruding the marginal portions of the gasket above and below the shoulder 6 into the spaces there provided for this overflow of the gasket material. The atmospheric pressure continues permanently, so that the temporary clamp may be removed.

The proportions herein shown for the various parts are based upon the experience of actual practice. It will be understood, however, that the proportions may be varied and the parts otherwise modified within the scope of the appended claims.

I claim as my invention:—

1. A container having a sealing shoulder for receiving a gasket, a gasket on said sealing shoulder, and a cover having a depending flaring rim, extending past the sealing shoulder and the said gasket in sealing relation thereto, and also forming a slip joint with the container below the sealing shoulder, with an annular space between the sealing shoulder and the said slip joint for receiving an edge of the gasket.

2. A container having a sealing shoulder for receiving a gasket, a gasket on said sealing shoulder, a cover having a depending flaring rim extending past the sealing shoulder and the said gasket in sealing relation thereto, and also forming a telescoping joint with the container below the sealing shoulder with an annular space between the sealing shoulder and the said slip joint for receiving an edge of the gasket, and means for yieldingly holding the cover in contact with the gasket.

3. A container having a sealing shoulder for receiving a gasket, a gasket on said sealing shoulder, a cover having a depending flaring rim extending past the sealing shoulder and the said gasket in sealing relation thereto, and also forming a slip joint with the container below the sealing shoulder with an annular space between the sealing shoulder and the said slip joint for receiving an edge of the gasket, and a temporary clamp for yieldingly holding the cover upon the gasket, the container being provided with a seat for receiving the said clamp.

WILLIAM A. LORENZ.